United States Patent [19]
Bauer et al.

[11] Patent Number: 5,570,873
[45] Date of Patent: Nov. 5, 1996

[54] LONGITUDINALLY ADJUSTABLE GAS SPRING WITH A LONGITUDINALLY ADJUSTABLE COLUMN

[75] Inventors: Hans-Peter Bauer; Hans J. Bauer, both of Altdorf, Germany

[73] Assignee: Suspa Compart Aktiengesellschaft, Altdorf, Germany

[21] Appl. No.: 490,527

[22] Filed: Jun. 14, 1995

[30] Foreign Application Priority Data

Jun. 16, 1994 [DE] Germany ............................ 44 20 914.2

[51] Int. Cl.$^6$ ........................................................ F16F 9/02
[52] U.S. Cl. ................. 267/64.12; 188/300; 188/322.19; 248/161
[58] Field of Search ....................................... 188/300, 312, 188/322.21, 322.19, 313, 318; 267/64.12, 64.13, 64.28; 248/161

[56] References Cited

U.S. PATENT DOCUMENTS

| | | | |
|---|---|---|---|
| 3,656,593 | 4/1972 | Bauer et al. | 188/300 |
| 4,844,392 | 7/1989 | Bauer et al. | 248/162.1 |
| 4,969,619 | 11/1990 | Bauer et al. | 248/161 |
| 5,141,210 | 8/1992 | Bauer et al. | 267/64.12 |
| 5,273,259 | 12/1993 | Bauer et al. | 267/64.12 |
| 5,443,573 | 8/1995 | Thiele et al. | 267/64.12 |

FOREIGN PATENT DOCUMENTS

| | | | |
|---|---|---|---|
| 4114226 | 11/1992 | Germany | 267/64.12 |
| 9402656 | 5/1994 | Germany . | |

*Primary Examiner*—Robert J. Oberleitner
*Assistant Examiner*—Peter M. Poon
*Attorney, Agent, or Firm*—Browdy and Neimark

[57] ABSTRACT

A longitudinally adjustable gas spring has a housing of which the edge on the side where the piston rod exits, projects freely. With the housing being moved as far as possible into an upright tube of a longitudinally adjustable column, the edge can at least in part overlap a damping member located on the piston rod, and with the housing being extracted as far as possible from the upright tube, it can serve additionally as a guidance in a guide bush of the upright tube.

9 Claims, 5 Drawing Sheets

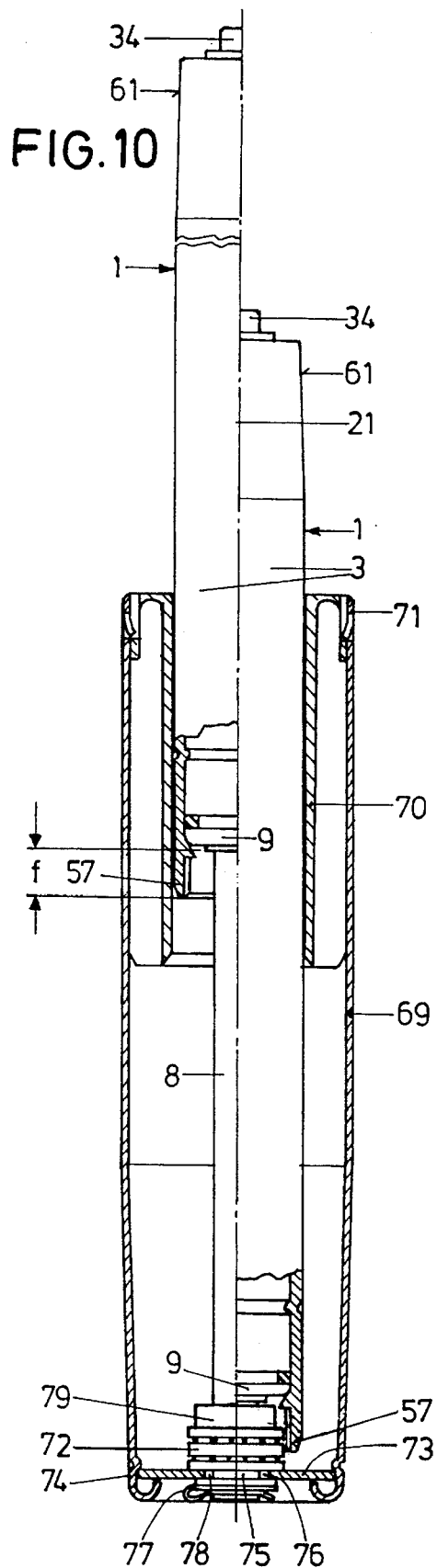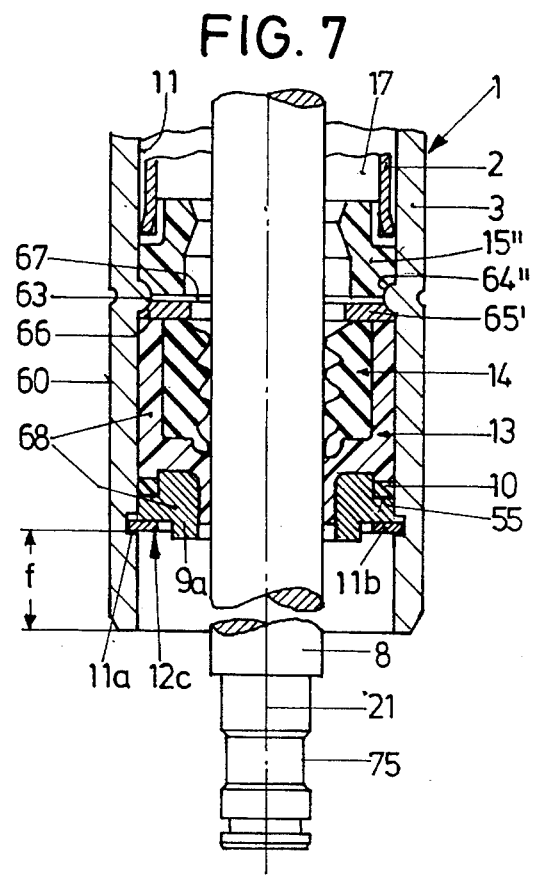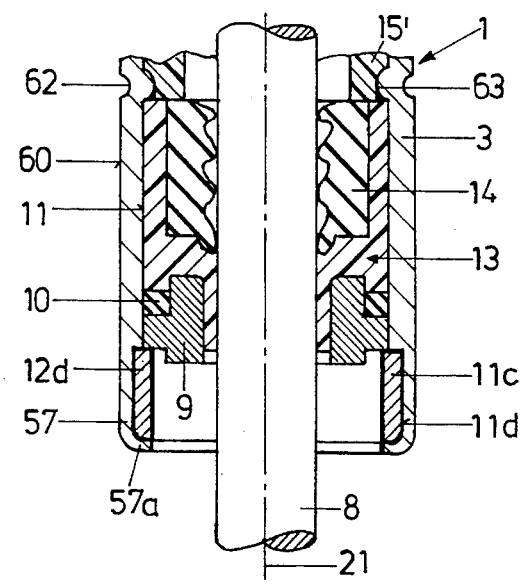

5,570,873

LONGITUDINALLY ADJUSTABLE GAS SPRING WITH A LONGITUDINALLY ADJUSTABLE COLUMN

BACKGROUND OF THE INVENTION

1. Field of the Invention

The invention relates to a longitudinally adjustable gas spring for adjustable-height chairs and tables, comprising an exterior cylinder with a central longitudinal axis, an interior cylinder arranged concentrically to the central longitudinal axis in the exterior cylinder, a piston arranged displaceably in the direction of the central longitudinal axis in the interior cylinder, a piston rod arranged concentrically to the central longitudinal axis and mounted on the piston and guided out of the one end of the exterior cylinder and a valve on the other end of the exterior cylinder. The valve has a valve body with an annular groove open towards the inside wall of the exterior cylinder which contains an annular seal. A sealing arrangement is formed between the piston rod and the inside wall of the exterior cylinder on the one end of the exterior cylinder, which arrangement has a sealing body with an annular groove open towards the inside wall of the exterior cylinder which accomodates an annular seal. A deformation provided on the edge of the exterior cylinder retains the valve body, and a deformation provided on the edge of the exterior cylinder and retains the sealing body. The invention further relates a longitudinally adjustable column for adjustable-height chairs, tables or the like, having such a longitudinally adjustable gas spring and having an upright tube with a first end a second end, and comprising a guide bush arranged on said first end of the upright tube and guiding the exterior cylinder of the gas spring, a bottom plate arranged on said second end of the upright tube and having an opening passed through with some radial clearance by a pin of the piston rod, a pivot bearing bearing against the bottom plate on the one hand and against the piston rod on the other hand, a safeguard element between the piston rod and the bottom plate, and a damping member arranged on the piston rod between the pivot bearing and the sealing body.

2. Background Art

Longitudinally adjustable gas springs of the generic kind known from U.S. Pat. No. 4,844,392 have a valve body having, among other things, an annular groove on its outside, in which an annular seal is located bearing sealingly against the inside wall of the exterior cylinder. Conventionally, the sealing body is of two-piece design, an annular groove open to the outside being formed in an external closing disc and being completed on one side by a sleeve. This sleeve houses a seal bearing against the piston rod. A seal bearing against the inside wall of the exterior cylinder is arranged in the annular groove. The pre-assembled unit consisting of a valve, a piston with a piston rod and a sealing body with seals and the interior cylinder is inserted with one side, regularly with the valve ahead, into the exterior cylinder. Then the edges of the exterior cylinder are beaded around the valve body and the closing plate, respectively. Since with this kind of insertion, the seal located in the annular groove of the valve body is pushed through the full length of the exterior cylinder, the latter's surface must have excellent surface qualities and little roughness for the annular seal not to be damaged. For this reason, seamless drawn steel tubes or at least welded steel tubes subjected to follow-up drawing are used. Seamless drawn tubes or follow-up drawn welded tubes are very expensive. The valve body on the one hand, and the sealing body on the other are arrested in the direction of the central longitudinal axis by beads of the adjacent edges of the exterior cylinder. When gas springs of this type are used in longitudinally adjustable columns for chairs, tables or the like, the end of the housing assigned to the sealing body and located on the side of the piston rod exit contacts the elastic damping member conventionally consisting of an annular cylindrical rubber body and located on a pivot bearing, when the housing is inserted as far as possible into the upright tube of the column. When the gas spring is extracted as far as possible from the upright tube, the housing of the gas spring is no longer arranged full length in a guide bush in which it is guided in relation to the upright tube. This increases the risk of tilting.

SUMMARY OF THE INVENTION

It is the object of the invention to embody a gas spring of the generic type such that when used in a longitudinally adjustable column for chairs, tables or the like, it still has as long as possible a guiding length even with the upright tube extracted from the housing, while the constructional and production-technological requirements are kept as low as possible.

In accordance with the invention, this object is solved in a longitudinally adjustable gas spring in that at least the edge, assigned to the sealing body, of the exterior cylinder is substantially annularly cylindrical and projects from the sealing body, and in a longitudinally adjustable column it is solved in that at least the edge, assigned to the sealing body, of the exterior cylinder is substantially annularly cylindrical and projects from the sealing body, and in that when the exterior cylinder of the gas spring is moved as far as possible into the upright tube, the edge, assigned to the sealing body, of the exterior cylinder at least in part overlaps at least the damping member in the direction of the central longitudinal axis. The measures according to the invention ensure that the final assembly of the gas spring is particularly simple, the edge of the exterior cylinder being provided on its inside with one or several projections regularly distributed along the circumference of the exterior cylinder. From aspects of manufacturing technology, this is particularly simple to achieve. The edge projecting beyond the sealing body prolongs the housing, it provides for additional guiding length in the guide bush when the gas spring is moved as far as possible out of the upright tube. On the other hand, this projecting edge does not interfere when the gas spring is inserted as far as possible into the upright tube, since the edge overlaps the annular damping spring member, anyway available, and possibly even the pivot bearing.

The at least one projection retaining the sealing body is particularly easy to be realized by the measures according to which the deformation provided on the edge of the exterior cylinder and retaining the sealing body is formed by at least one projection or by several projections distributed along the circumference of the exterior cylinder, the projections being configured as projection noses cut from the inside wall of the exterior cylinder and bearing against the sealing body.

The measures according to the invention further entail that at least the annular seal pushed through the exterior cylinder over the latter's full length does not bear against the inside wall of the exterior cylinder or does so with minor friction only during the pushing operation, and is subsequently compressed in the axial direction by the compression of the two parts, accommodating the annular seal between them, of the valve body and/or sealing body, whereby it is clamped radially outwards. In this way the sealing contact between the annular seal and the inside wall of the exterior cylinder is produced only when the annular seal has taken its pre-determined position relative to the inside wall of the exterior cylinder. The measures may be provided on the valve on the one hand and on the seal body on the other, i.e. where the piston rod exits; but it is of course also sufficient for them to be provided in the portion that is pushed through the exterior cylinder over the latter's full length. The measures according to the invention may also be used to create a possibility of filling the gas spring with compressed gas. Of course, these measures can be implemented regardless of whether the edge of the exterior cylinder projects.

Details of the invention will become apparent from the ensuing description of an example of embodiment, taken in conjunction with the drawing.

BRIEF DESCRIPTION OF THE DRAWING

FIG. 7 is a partial longitudinal section of a further slightly modified embodiment of a longitudinally adjustable gas spring, FIG. 8 is a partial longitudinal section of a further embodiment of a longitudinally adjustable gas spring slightly modified as compared to FIG. 5, FIG. 10 is a longitudinally adjustable column for chairs, tables or the like with a gas spring according to FIGS. 1, 5, 6, 7, 8 or 9.

DESCRIPTION OF THE PREFERRED EMBODIMENT

Figure 1:
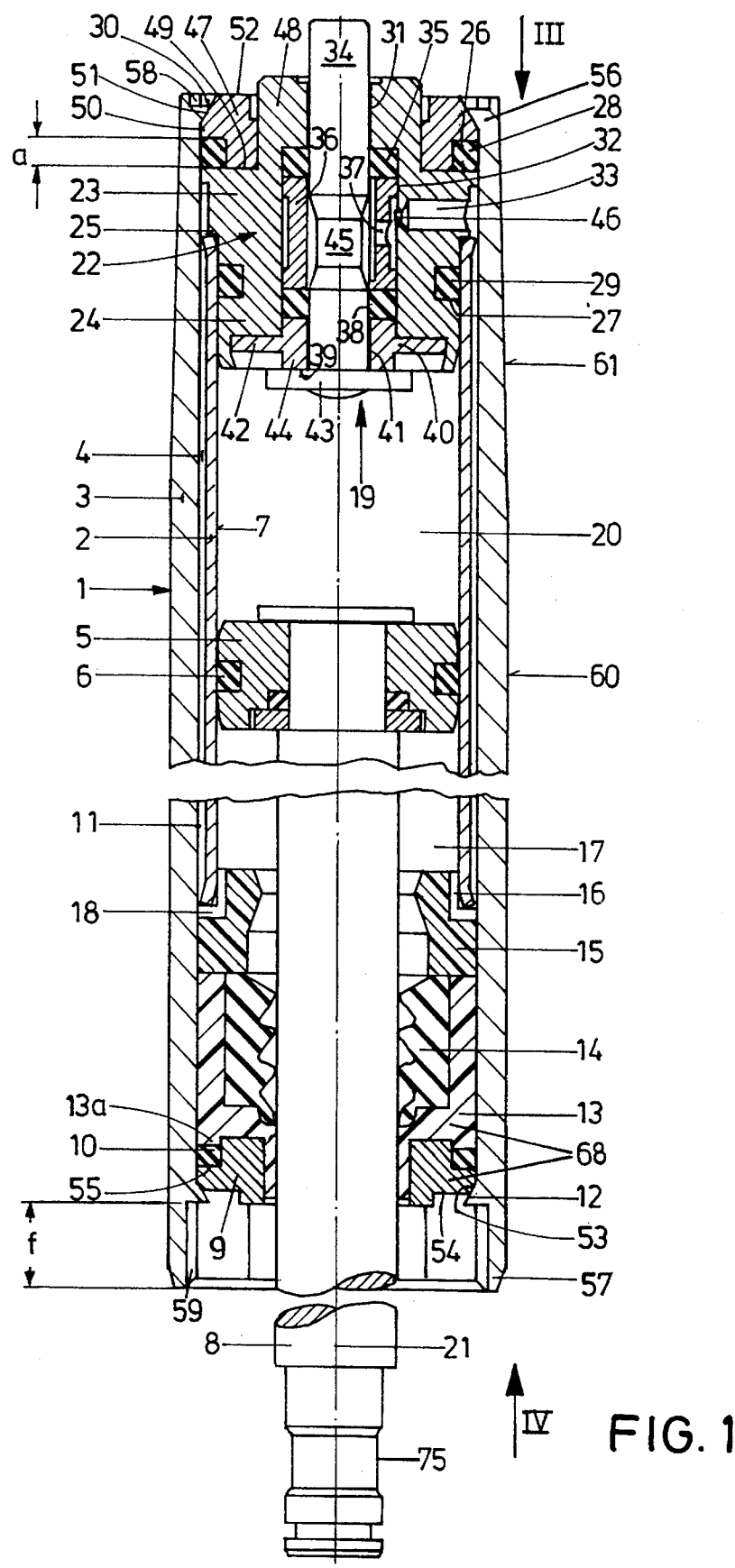
FIG. 1 is a longitudinal section of a longitudinally adjustable gas spring.

The longitudinally adjustable gas spring of FIG. 1 has a housing 1 substantially consisting of two tubes of different diameter positioned concentrically one within the other, namely an interior cylinder 2 and an exterior cylinder 3. As a result of the difference in diameter of the interior cylinder 2 and the exterior cylinder 3, an annular space 4 is formed between the exterior cylinder 3 and the interior cylinder 2.

An approximately annular piston 5 is arranged axially displaceably in the interior cylinder 2 and by way of a sealing ring 6, is sealed with its circumference gas-tight in relation to the inside wall 7 of the interior cylinder 2. The piston 5 is mounted on one end of a piston rod 8 guided coaxially to the housing 1. This piston rod 8 is guided out of one end of the housing 1. At this end, the housing 1 is closed by a closing ring 9 sealed on its circumference by means of an annular seal 10 to be gas-tight in relation to the inside wall 11 of the exterior cylinder 3. The closing ring 9 is retained axially outwards by projection noses 12 of the exterior cylinder 3. A cup-shaped sleeve 13 bears against the closing ring 9 on the inside and accommodates a multiple lip seal 14 which rests sealingly with its lips on the piston rod 8. This prevents any exit of gas to the outside along the surface of the piston rod 8.

From the interior chamber of the housing 1, a centering member 15 resting on the inside wall 7 of the exterior cylinder 3 bears against the sleeve 13; it is provided with ribs 16 on which the interior cylinder 2 is radially supported, i.e. centered, with its inside wall 7. The interior cylinder 2 is also axially firmly supported on these ribs 16, i.e. it is axially arrested on one side. Solely ribs 16 being provided for centering and axially supporting the interior cylinder 2, the annular space 4 is connected with the housing chamber 17 inside the interior cylinder 2 in this portion, the housing chamber 17 being defined between the piston 5, the end of the housing 1 on the side of the piston rod exit and the inside wall 7 of the interior cylinder 2. Overflow channels 18 between the housing chamber 17 and the annular space 4 are formed between the ribs 16.

On the end opposite to where the piston rod exits, a valve 19 is arranged by means of which the housing chamber 20 located inside the interior cylinder 2 between the piston 5 and the valve 19 can be connected with or separated from, the annular space 4 and thus the other housing chamber 17.

The entire gas spring inclusive of the valve 19 is substantially designed in symmetry to the central longitudinal axis 21. The valve 19 has a valve body 22 consisting of an external section 23 and an internal section 24. The external section 23 rests on the inside wall 11 of the exterior cylinder 3, thereby centering the valve body 22 in relation to the exterior cylinder 3. The equally cylindrical section 24 of smaller diameter rests on the inside wall 7 of the interior cylinder 2, centering thus taking place between the valve body 22 and the interior cylinder 2 and consequently also between the interior cylinder 2 and the exterior cylinder 3. A stop collar 25, by means of which the valve body 22 bears against the interior cylinder 2 in the axial direction, is formed where the section 23 passes into the section 24. In the vicinity of the section 23 on the one hand and of the section 24 on the other hand, annular seals 28, 29 are arranged in corresponding annular grooves 26, 27, by means of which seals 28, 29 a gas-tight connection is produced between the section 23 and the inside wall 11 of the exterior cylinder 3 on the one hand and between the internal section 24 and the inside wall 7 of the interior cylinder 2 on the other hand. The valve body is retained axially outwards by projection noses 30 of the exterior cylinder 3, whereby again the interior cylinder 2 is arrested axially outwards.

In the vicinity of its external section 23, the valve body 22 is provided with a cylindrical, coaxial guide bore 31 which, in the direction towards the housing chamber 20, is followed by an interior valve body chamber 32 substantially located in the external section 23. This interior chamber 32 has a greater diameter than the guide bore 31. An overflow channel 33 radially passing through the valve body 22 and opening on its outside into the annular space 4, discharges into this interior chamber 32.

A valve pin 34 is arranged in the valve body 22 and projects out of the valve body 22 and thus out of the gas spring. This substantially cylindrical valve pin 34 is guided in the guiding bore 31. An inner annular seal 35 is arranged where the guide bore 31 passes into the interior chamber 32, which annular seal 35 is arrested axially outwards by the transition from the interior chamber 32 to the guide bore 31 and which bears radially against the valve pin 34 on the one hand and against the wall of the interior chamber 32 on the other, so that any exit of gas through the guide bore 31 is precluded. The inner annular seal 35 is arrested axially in the direction towards the housing chamber 20 by a spacing sleeve 36 which is provided with one or several passage openings 37, so that gas may also get into the spacing sleeve 36.

An inner annular seal 38 resting radially on the inside wall of the interior chamber 32 and on the valve pin 34 likewise bears against the end of the spacing sleeve 36 facing the housing chamber 20. It bears against a stop face 39 axially to the housing chamber 20.

This stop face 39 is formed on a sleeve-like closing member 40 surrounding the valve pin 34 while forming an annular gap 41. An annular collar 42 projecting radially outwards, of this closing member 40 is axially arrested in the internal section 24 of the valve body 22. By means of a retaining disc 43, the valve pin 34 is safeguarded against being pushed out of the valve body 22 to the outside. When the valve 19 is closed, this retaining disc 43 bears against a stop face 44 facing the housing chamber 20, of the closing member 40. In the position of rest of the valve pin 34 shown in FIGS. 1 and 2, in which the valve 19 is closed, a necking 45 of the valve pin 34 is located between the inner annular seals 35 and 38, i.e. the housing chamber 20 is separated gas-tight from the annular space 4 and thus from the housing chamber 17. By the valve pin 34 being pushed into the valve body 22, the necking 45 by-passes the inner annular seal 38 facing the housing chamber 20, so that gas may flow from the housing chamber 17 through the annular space 4, the interior valve body chamber 32 and the annular gap 41 into the housing chamber 20 and vice versa. The basic way of working of this longitudinally adjustable gas spring at least partially filled with compressed gas is, by the way, generally known for instance from U.S. Pat. No. 3,656,593.

The overflow channel 33 has a throttling portion 46 of minor cross-sectional area. The diameter of such a throttling postion 46 is less than 1.0 mm and preferably in the range of 0.4 to 0.7 mm. When the overflow channel 33 is provided with such a throttling portion 46, then the entering and exiting motion of the piston rod 8 with the valve 19 opened takes place slowly.

As far as gas or compressed gas has been mentioned in the foregoing, this can also be a liquid pressurized by compressed gas, if—as known—the gas spring is partially filled with a liquid and only in part with a compressed gas pressurizing this liquid.

Figure 2:
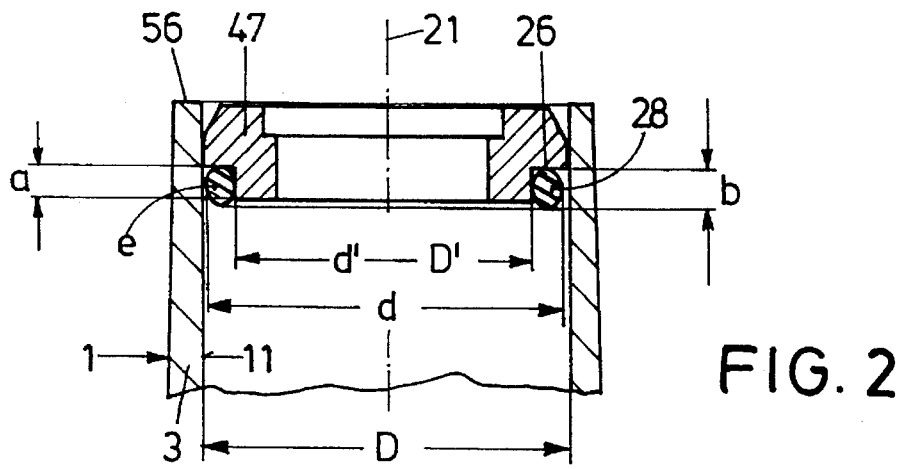
FIG. 2 is a longitudinal section of part of the valve body of the gas spring with an annular seal.

As seen in FIGS. 1 and 2, the valve body 22 is of two-piece structure, i.e. a ring 47 is assigned to the external section 23, the ring 47 being arranged on a socket-like portion 48 housing the guide bore 31, of the external section 23 and bearing against a stop face 49 extending radially to the axis 21, of the external section 23. The annular groove 26 is formed in the ring 47 and is completed by the stop face 49 as a lateral face of the annular groove 26. On its cylindrical circumferential surface 50, the ring 47 is provided with a sloping edge 51 in the form of a truncated cone which tapers towards its outer surface 52. A corresponding sloping edge 53 likewise tapering towards the outer surface 54 is formed on the closing ring 9 located on the end where the piston rod exits.

It is roughly outlined in FIG. 2 that the annular seal 28 and possibly also the annular seal 10 in their non-deformed condition have an outside diameter d that is slightly less than the inside diameter D of the exterior cylinder 3, of which the inside wall 11 is of continuous cylindrical design, i.e. it has the same inside diameter D over its entire length. The annular groove 26 in the ring 47 and the annular groove 55 accommodating the annular seal 10 and provided in the closing ring 9 are formed such that when the ring 47 is pressed against the stop face 49 of the valve body 22 or when the closing ring 9 is pressed against the cup-shaped sleeve 13, the annular seal 28 or the annular seal 10 are compressed axially such that they are forced radially outwards, whereby their outside diameter increases to such an extent that the annular seal 28 or 10, respectively, rests sealingly on the inside wall 11 of the exterior cylinder 3. When the ring 47 bears against the stop face 49, the axial length a of the annular groove 26 is less than the thickness b of the annular seal 28 or 10, respectively, in their non-clamped condition, as seen in FIG. 2. The inside diameter d' of the annular seal 28 and 10, respectively, corresponds to the inside diameter D' of the annular groove 26 and 55, respectively. The cross-sectional area e of the annular seal 28 slightly exceeds the cross-sectional area of the annular groove 26. Consequently, e>0.5 a (D—D') applies. For reasons of clarity, the specified dimensional relations are shown only for the valve 19 in FIG. 2. So as to prevent the annular seal 10, when applied, from moving out of the annular groove 55 and between the closing ring 9 and the cup-shaped sleeve 13, the latter is provided with an annular collar 13a penetrating into the annular groove 55 and causing the clamping of the annular seal 10 during compression in the direction of the axis 21.

Figure 3:
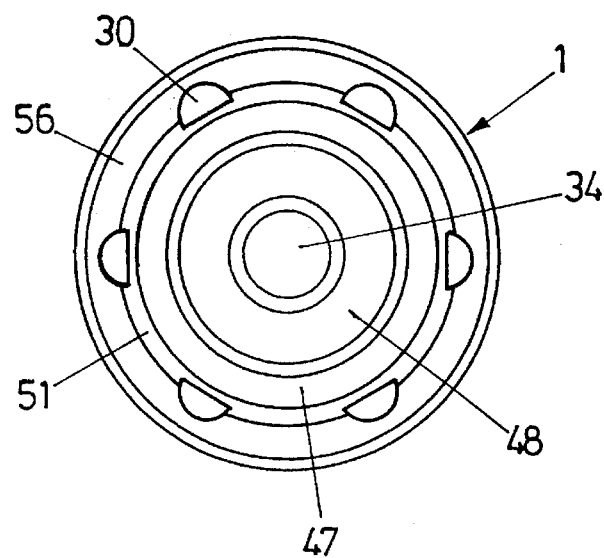
FIG. 3 is a plan view of the end of the gas spring on the side of the valve according to the arrow III of FIG. 1.
Figure 4:
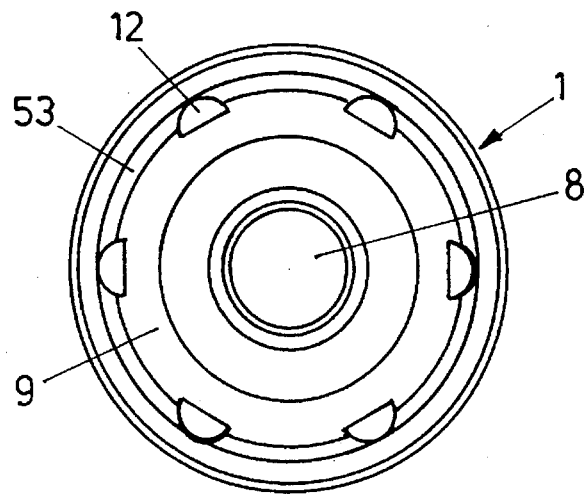
FIG. 4 is a plan view of the end of the gas spring on the side of the piston rod exit according to the arrow IV of FIG. 1.

The assembly of the gas spring takes place as follows:

The entire valve 19 is pre-assembled and inserted into the associated end of the interior cylinder 2. The piston rod 8 with the piston 5 is inserted from the other side into the interior cylinder 2. The centering member 15 is inserted into the corresponding end of the interior cylinder 2. The cup-shaped sleeve 13 with the multiple lip seal 14 is slipped on to the piston rod 8 from the latter's free end until it stops on the centering member 15. The closing ring 9 with the annular seal 10 is loosely slipped on the sleeve 13 in the same way as the ring 47 with the annular seal 28 is placed on the socket-like portion 48 of the valve body 22. This pre-assembled unit is inserted, the valve 19 ahead, into the exterior cylinder 3. Referred to FIG. 1, it is pushed into and through, the exterior cylinder 3 from the lower end of the housing 1 on the side of the piston rod. As a result of the specified dimensional deviation of the annular seal 28 in relation to the inside wall 11 of the exterior cylinder 3, the annular seal 28 does not contact the inside wall 11 of the exterior cylinder 3 during this pushing operation. The same is true for the annular seal 10 when the unit is inserted, the piston rod 8 ahead, into the exterior cylinder 3 from the end of the housing 1 on the side of the valve—the upper end in FIG. 1. At the end of this insertion, punching tools are forced against the fronts of the edges 56, 57 of the exterior cylinder 3 in parallel to the axis 21 and concentrically to the latter, in such a way that a chip is cut out of the inside wall 11 of the exterior cylinder, which chip remains tightly bonded on the exterior cylinder 3 and as a result of the simultaneous upsetting operation, forms a projection nose 30 and 12, respectively, directed inwardly towards the axis 21 and resting on the sloping edge 51 of the ring 47 and the sloping edge 53 of the closing ring 9, respectively. These chips forming the projection noses 30 and 12 are cut out of the inside wall 11 of the exterior cylinder 3 by forming comparatively fine grooves 58 amd 59, respectively, of only a few tenth of a millimeter of depth. As seen in FIGS. 3 and 4, it is useful to provide six of these projections 30 and 12, respectively, at each end of the exterior cylinder 3. While these projections 30 and 12 are formed, the ring 47 is forced, on the one hand, against the stop face 49 of the valve body 22 and on the other hand, the closing ring 9 is forced against the cup-shaped sleeve 13, whereby, as a result of the specified dimensional relations, the annular seals 28 and 10, respectively, are compressed in the direction of the axis 21, thus being deformed radially outward. It is only now that they rest on the inside wall 11 of the exterior cylinder 3 with the required sealing pressure and of course, they also rest on the walls of the annular groove 26 and 55, respectively.

Since at least the annular seal 28 and 10, respectively, pushed almost completely through the exterior cylinder 3 does not contact the inside wall 11 of the exterior cylinder 3 when pushed through, there is no need for the inside wall 11 to have a good surface quality, because the annular seal 28 or 10, respectively, cannot be damaged by it. There is no need either for seamless drawn tubes to be used for the exterior cylinder 3 nor, where welded tubes are used, for any follow-up drawing of their inside or any other surface refinement. As compared with this, the external surface 60 of the exterior cylinder 3 must be shaped to have a precisely cylindrical form of little irregularities, so that a cone 61 can also be cut in the vicinity of the valve 19, serving to be fixed in a correspondingly configured accommodation on the bottom of a chair seat or the like.

Figure 5:
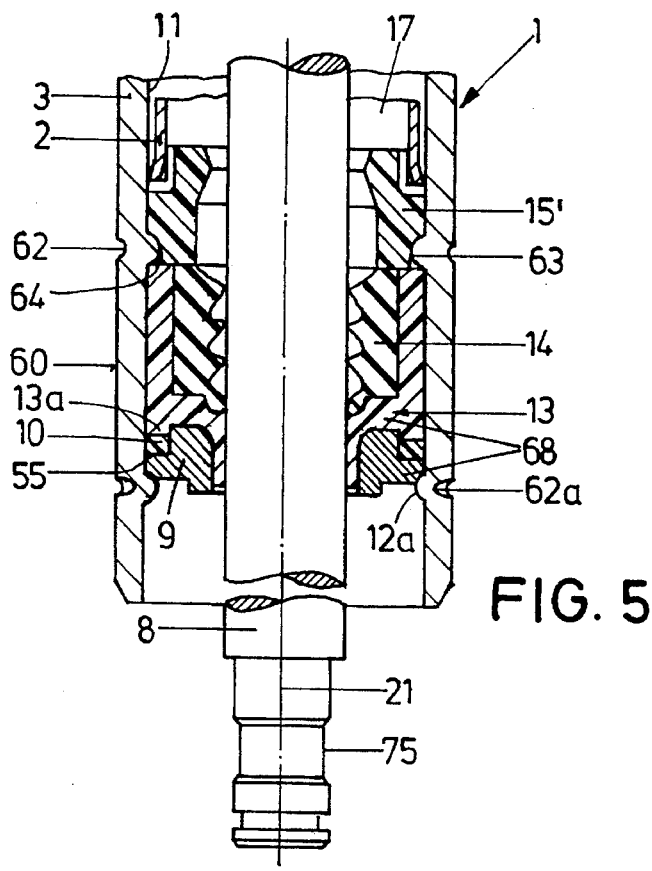
FIG. 5 is a partial longitudinal section of a slightly modified embodiment of a longitudinally adjustable gas spring.

In the embodiment according to FIG. 5, the exterior cylinder 3 of the gas spring is provided on its external surface 60 with at least one impression 62 directed inwardly towards the axis 21, to which corresponds at least one projection 63 formed on the inside wall 11 of the exterior cylinder. The impression 62 and, correspondingly, the projection 63 may be formed by an annularly extending crimp. However, there is also the possibility that several shallow impressions 62 are provided, which cooperate with corresponding approximately semi-spherical projections 63 distributed over the circumference in a plane radial to the axis 21. This does not make any difference in the drawing. The cup-shaped sleeve 13 axially firmly bears against this at least one projection 63. The centering member 15' is provided with one external recess 64 accommodating the at least one projection 63. The multiple lip valve 14 bears against the centering member 15' in the direction of the axis 21—as in the example of embodiment according to FIG. 1. In this embodiment, projection noses 12a are provided which, same as the projections 63, are produced by shallow impressions 62a on the external surface 60 of the exterior cylinder 3 of the gas spring.

Figure 6:
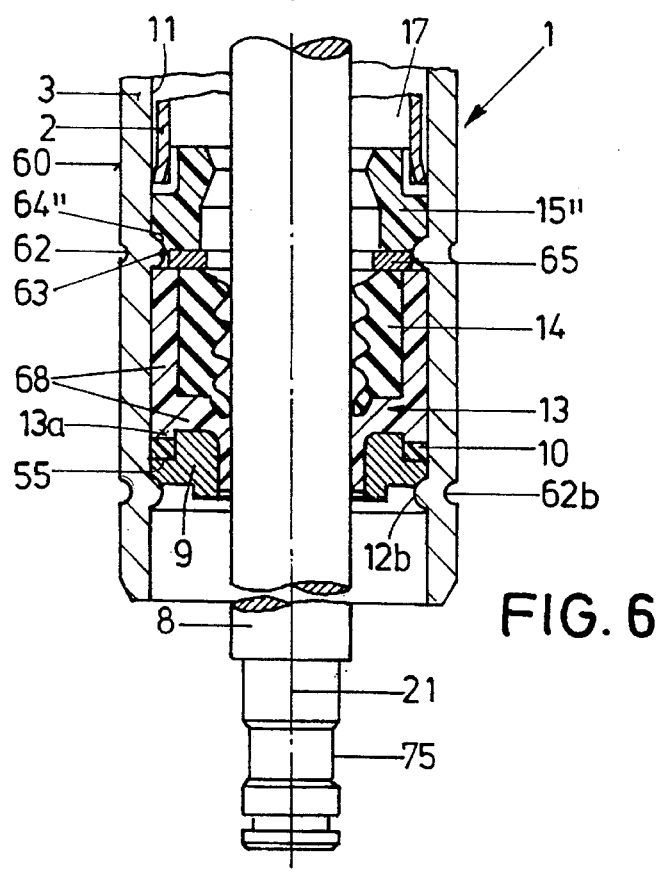
FIG. 6 is a partial longitudinal section of a further slightly modified embodiment of a longitudinally adjustable gas spring.

In the embodiment according to FIG. 6, the cup-shaped sleeve 13 again bears against at least one projection 63. In this case, the multiple lip valve 14 bears against an annular disc 65 in the direction of the axis 21 and towards the housing chamber 17, the annular disc 65 in turn bearing against the centering member 15" which is provided with a recess 64" partially accommodating the at least one projection 63. In this embodiment provision is made of only one surrounding projection 12b which retains the closing ring 9 and—as above explained for FIG. 5—which is produced by a surrounding crimp 62b on the external surface 60 of the exterior cylinder 3.

In the further embodiment according to FIG. 7, the centering member 15" accommodates the at least one projection 63 in its recess 64" and is thus arrested axially in the housing 1 in the direction towards the end where the piston rod exits. The multiple lip seal 14 and the cup-shaped sleeve 13 bear against an annular disc 65' in the direction of the axis 21 and towards the housing chamber 17, the annular disc 65' bearing against the at least one projection 63. To this end, it has an external recess 66 accommodating the at least one projection 63. The centering member 15" lies free in relation to the annular disc 65', which is roughly outlined by a gap 67 in FIG. 7. In this embodiment, the projection 12c is formed by a fastener 11b, for instance a Seeger circlip ring, arranged in an internal groove 11a in the inside wall 11 of the exterior cylinder 3.

The embodiment according to FIG. 8 corresponds to that according to FIG. 5, the projection 12d bearing against the closing ring 9 being formed by a spacing sleeve 11c formed in a recess 11d on the inside wall 11 of the exterior cylinder 3, namely in the vicinity of the latter's edge 57. In this case, the edge 57 is provided with a bead 57a retaining the spacing sleeve 11c and forcing it against the closing ring 9.

Figure 9:
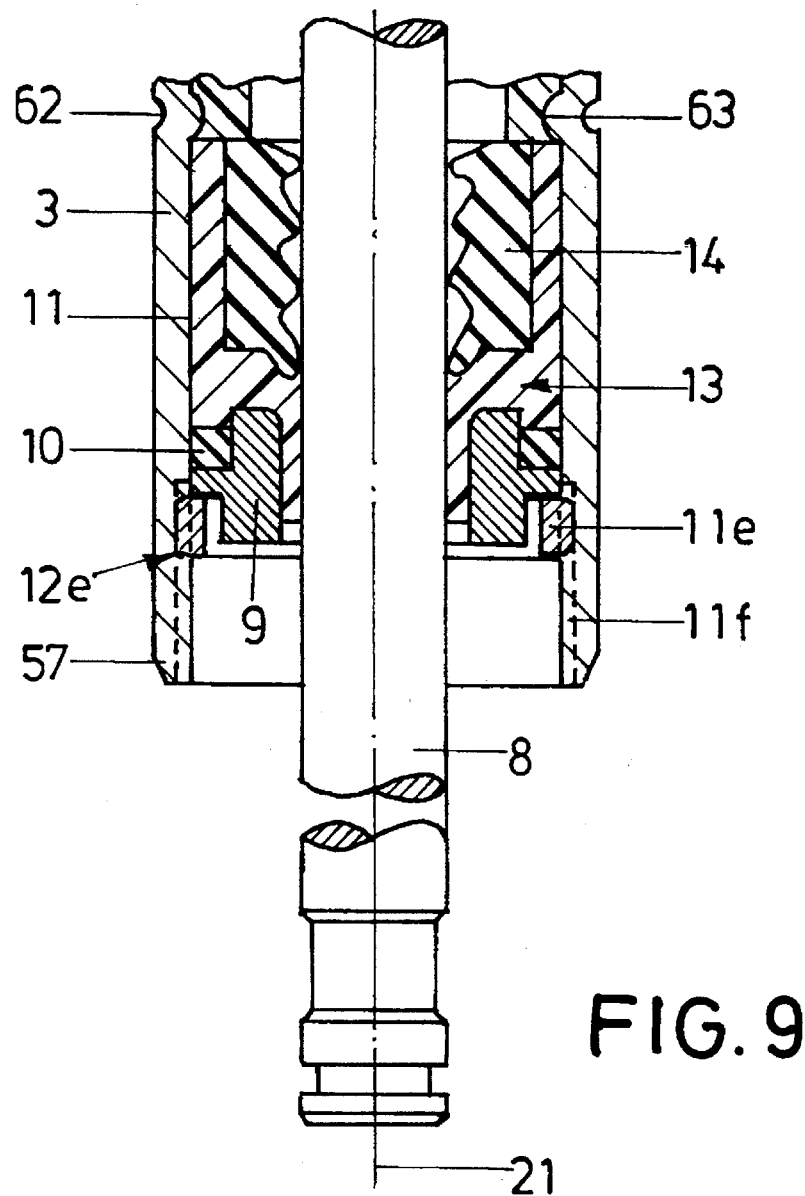
FIG. 9 is a partial longitudinal section of a further embodiment of a longitudinally adjustable gas spring slightly modified as compared to FIG. 5.

The embodiment according to FIG. 9 likewise corresponds substantially to that according to FIG. 5, in this case the projection 12e being formed by an externally threaded ring 11e screwed into an internal thread 11f on the inside wall 11, which is formed on the inside wall 11 of the exterior cylinder 3 in the vicinity of the latter's edge 57.

In all the embodiments, the cup-shaped sleeve 13 and the closing ring 9 in common form a sealing body 68.

In all the embodiments shown, the cup-shaped sleeve 13 does not bear gastight against the inside wall 11 of the exterior cylinder 3, the available gap being so narrow that it cannot be illustrated in the drawing. Together with the specified measures, this can be used to bring about the filling of the gas spring with compressed gas. In the embodiment according to FIG. 1, this is realized in such a way that after the insertion of the unit specified above consisting of the valve 19, the interior cylinder 2, the piston rod 8 with the piston 5, the centering member 15, the cup-shaped sleeve 13 and the seal 14 and after the placing of the closing ring 9 with the annular seal 10 and after the production of the projection noses 30 in the vicinity of the valve 19, the housing 1 can be filled with compressed gas, which is is forced into the housing 1 between the closing ring 9, the non-clamped seal 10, the cup-shaped sleeve 13 on the one hand and the inside wall 11 of the exterior cylinder 3 on the other hand. In the embodiments according to FIGS. 5, 6 and 7, only a unit consisting of a valve 19, an interior cylinder 2, a piston rod 8 with a piston 5 and a centering member 15' or 15" are inserted in the exterior cylinder 3 and the projection noses 30 are produced in the vicinity of the valve 19 on the one hand and the at least one projection 63 is produced on the other hand, whereby this unit is arrested in the exterior cylinder 3 in both directions of the axis 21. When several projections 63 are provided that are distributed over the circumference, for instance six projections 63 arranged at equal angular distances, then the unit can be compressed in an especially advantageous way by axial and radial clamping of the seal 28. For, from aspects of mounting technology, this unit can be compressed by means of a punch on which the tools to produce the impressions 62 and thus the projections 63 are arranged. Subsequently, the cup-shaped sleeve 13, the seal 14 and the closing ring 9 with the annular seal 10 are placed and the housing 1 is filled with compressed gas. When the housing 1 is filled with compressed gas, the projections 12 are produced in the way described, the seal 10 being clamped as described, so that the housing 1 is then gas-tight. As is shown by the above specification, the embodiments according to FIGS. 5 to 9 are particularly suited to proceed with the filling with gas in the above described manner.

In all the embodiments according to FIGS. 1, 5, 6, 7, 8, 9 it is visible that at the end of the housing 1 where the piston rod exits, the edge 57 of the exterior tube 3 projects beyond the closing ring 9 by a length f. This results in further advantages as can be taken from the comments on FIG. 10. A chair column is shown there having an upright tube 69 in which a longitudinally adjustable gas spring of the kind described above is arranged as a pneumatic or hydropneumatic piston cylinder adjusting element. The housing 1 of the gas spring is supported displaceably in the direction of the axis 21 in a guide bush 70 which is arranged in an end 71—the upper end in FIG. 10—of the upright tube 69. In the embodiment shown, the exterior cylinder 3 is supported in the guide bush 70.

The piston rod 8 is supported in relation to a bottom plate 73 of the upright tube 69 in the direction of the axis 21 by way of an axial ball and roller bearing 72. The bottom plate 73 is located on the other end 74—the lower end in FIG. 10—opposite to the end 71, of the upright tube 69. A pin 75 of the piston rod 8 passing through the axial ball and roller bearing 72 extends through an opening 76 of the bottom plate 73 which opening 76 is formed concentrically to the axis 21. It is safe-guarded towards the underside of the bottom plate 73 against being pulled out by means of a securing spring clip 77. The diameter of the opening 76 exceeds the diameter of the pin 75. As a result of this described way of securing, the gas spring is rotatable in relation to the upright tube 69. By reason of the radial clearance 78 between the pin 75 and the opening 76 it is guided tiltably to some minor degree referred to the upright tube 69, i.e. free from canting in the guide bush 70. Finally, it is arrested with its piston rod 8 in the direction of the axis 21 in relation to the upright tube 69, so that upon longitudinal adjustments of the gas spring by actuation of the actuating pin 34, the housing 1 of the gas spring is moved out of or pushed into, the upright tube 69. An annular-disc-shaped damping element 79, for instance of rubber, is arranged on the piston rod 8 and serves as a stop absorber when the housing 1 of the gas spring is placed, namely when the housing 1 of the gas spring is moved as far as possible into the upright tube 69, i.e. when the chair column has its lowest possible height. At this, the edge 57 of the housing 1 overlaps the damping member 79 and, possibly, part of the axial ball and roller bearing 72 in the direction of the axis 21.

The damping element 79 comes to bear against the closing ring 9, and that against a stop collar 9a formed on the latter. This position is shown in FIG. 10 bottom right. If, however, the piston rod 8 takes its position, in which it is moved as far as possible out of the housing 1 and in which the housing 1 is moved as far as possible out of the upright tube 69, then the edge 57 additionally serves for guiding the housing 1 in the guide bush 70 which is the exclusive lateral guidance for the housing 1, the piston rod 8 being arranged with radial play in the bottom plate 73. A maximum of additional guiding length of the housing 1 in the guide bush 70 with the housing 1 being extracted is achieved when the length f of the edge 57 is dimensioned such that the front of the edge 57 all but contacts the bottom plate 73 for any extreme loading of the gas spring and thus when the damping member 79 is compressed. Of course, the diameter of the axial ball and roller bearing 71 and the damping element 79 must be chosen such that the edge 57 of the exterior cylinder 3, as the case may be together with the spacing sleeve 11c or the externally threaded ring 11e can be slipped over free of collision.

In practice, the length f of the edge 57 can exceed 5 mm and preferably amount to 10 to 15 mm, whereby again the guiding length in the guide bush 70 is clearly prolonged, and that when the housing 1 is extracted as far as possible by 20 to 25%.

What is claimed is:

1. A longitudinally adjustable gas spring for adjustable-height chairs and tables, comprising an exterior cylinder (3) with a central longitudinal axis (21) and having a first end with a first edge (57) and a second end with a second edge (56) and an inside wall (11), an interior cylinder (2) arranged concentrically to the central longitudinal axis (21) in the exterior cylinder (3), a piston (5) arranged displaceably in the direction of the central longitudinal axis (21) in the interior cylinder (2), a piston rod (8) arranged concentrically to the central longitudinal axis (21) and mounted on the piston (5) and guided out of said first end of the exterior cylinder (3), a valve (19) on said second end of the exterior cylinder (3), which valve (19) has a valve body (22) with an annular groove (26) open towards the inside wall (11) of the exterior cylinder (3) and containing an annular seal (28), a sealing arrangement between the piston rod (8) and the inside wall (11) of the exterior cylinder (3) on said first end of the exterior cylinder (3), which arrangement has a sealing body (68) with an annular groove (55) open towards the inside wall (11) of the exterior cylinder (3) and accommodating an annular seal (10), a first deformation provided on said first edge (57) of the exterior cylinder (3) and retaining the sealing body (68), and a second deformation provided on said second edge (56) of the exterior cylinder (3) retaining the valve body (22), wherein at least said first edge (57) assigned to the sealing body (68), of the exterior cylinder (3) is substantially annularly cylindrical and projects away from the sealing body (68), said first edge (57) further having an outer diameter substantially equal to an outer diameter of the exterior cylinder (3).

2. A longitudinally adjustable gas spring according to claim 1, wherein said first deformation is formed by at least one projection (12).

3. A longitudinally adjustable gas spring according to claim 2, wherein said first deformation is formed by several projections (12) distributed along the circumference of the exterior cylinder (3).

4. A longitudinally adjustable gas spring according to claim 3, wherein the projections (12) are configured as projection noses cut from the inside wall (11) of the exterior cylinder (3) and bearing against the sealing body (68).

5. A longitudinally adjustable column for adjustable-height chairs and tables having a longitudinally adjustable gas spring, comprising an exterior cylinder (3) with a central longitudinal axis (21) and having a first end with a first edge (57) and a second end with a second edge (56) and an inside wall (11), an interior cylinder (2) arranged concentrically to the central longitudinal axis (21) in the exterior cylinder (3), a piston (5) arranged displaceably in the direction of the central longitudinal axis (21) in the interior cylinder (2), a piston rod (8) arranged concentrically to the central longitudinal axis (21) and mounted on the piston (5) and guided out of said first end of the exterior cylinder (3), a valve (19) on said second end of the exterior cylinder (3), which valve (19) has a valve body (22) with an annular groove (26) open towards the inside wall (11) of the exterior cylinder (3) and containing an annular seal (28), a sealing arrangement between the piston rod (8) and the inside wall (11) of the exterior cylinder (3) on said first end of the exterior cylinder (3), which arrangement has a sealing body (68) with an annular groove (55) open towards the inside wall (11) of the exterior cylinder (3) and accommodating an annular seal (10), a first deformation provided on said first edge (57) of the exterior cylinder (3) and retaining the sealing body (68), and a second deformation provided on said second edge (56) of the exterior cylinder (3) retaining the valve body (22), said longitudinally adjustable column having an upright tube (69) with a first edge (71) and a second end (74), and further comprising a guide bush (70) arranged on said first end (71) of the upright tube (69) and guiding the exterior cylinder (3) of the gas spring, a bottom plate (73) arranged on said second end (74) of the upright tube (69) and having an opening passed through with some radial clearance by a pin (75) of the piston rod (8), a pivot bearing (72) bearing against the bottom plate (73) on the one hand and against the piston rod (8) on the other hand, a safeguard element (77) between the piston rod (8) and the bottom plate (73), and a damping member (79) arranged on the piston rod (8) between the pivot bearing (72) and the sealing body (68), wherein at least said first edge (57) assigned to the sealing body (68), of the exterior cylinder (3) is substantially annularly cylindrical and projects away from the sealing body (68), said first edge (57) further having an outer diameter substantially equal to an outer diameter of the exterior cylinder (3), and wherein when the exterior cylinder (3) of the gas spring is moved as far as possible into the upright tube (69), said first edge (57) assigned to the sealing body (68), of the exterior cylinder (3) at least in part overlaps at least the damping member (79) in the direction of the central longitudinal axis (21).

6. A longitudinally adjustable column according to claim 5, wherein said first edge (57) assigned to the sealing body (68), of the exterior cylinder (3) projects from the sealing body (68) by a length f to which f>5 mm applies.

7. A longitudinally adjustable column according to claim 5, wherein said first deformation is formed by at least one projection (12).

8. A longitudinally adjustable column according to claim 7, wherein said first deformation is formed by several projections (12) distributed along the circumference of the exterior cylinder (3).

9. A longitudinally adjustable column according to claim 8, wherein the projections (12) are projection noses (12) cut from the inside wall (11) of the exterior cylinder (3) and bearing against the sealing body (68).

\* \* \* \* \*